Patented Oct. 24, 1950

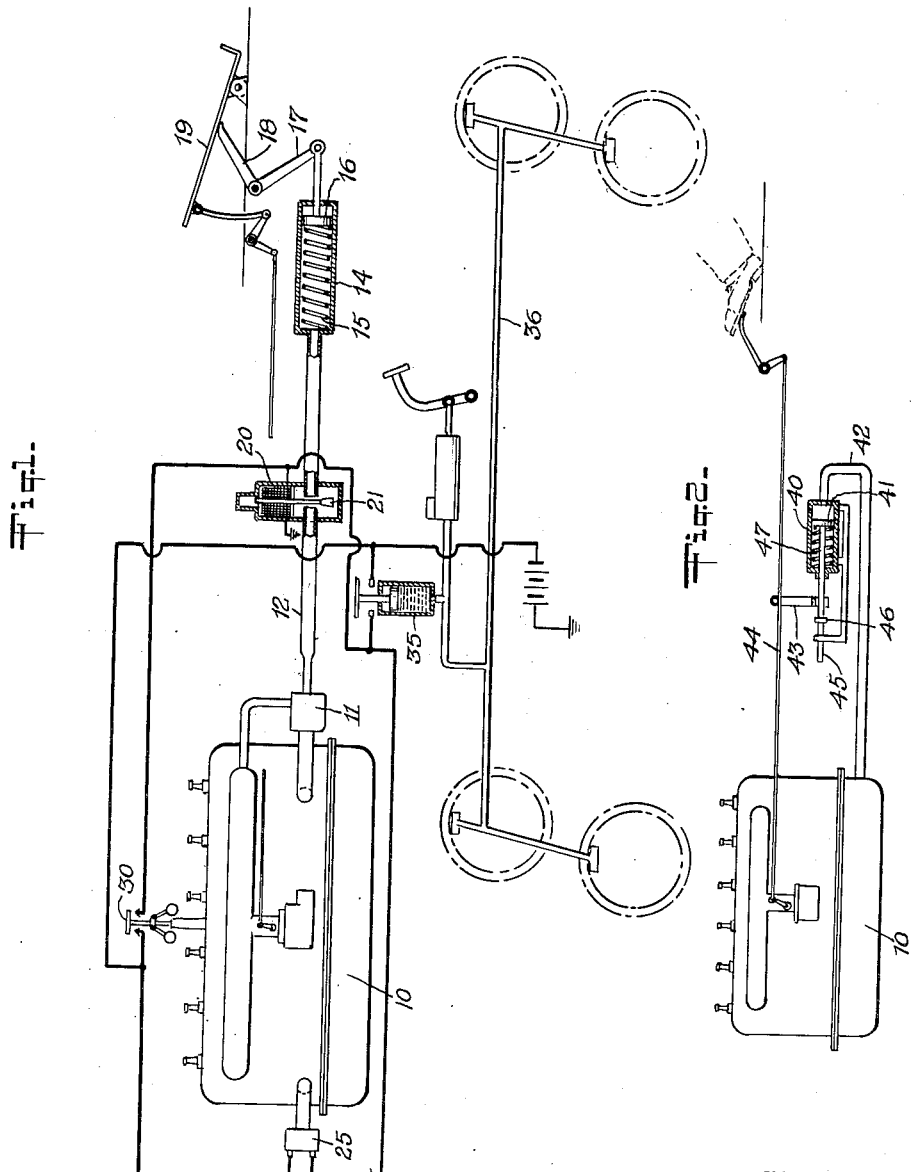

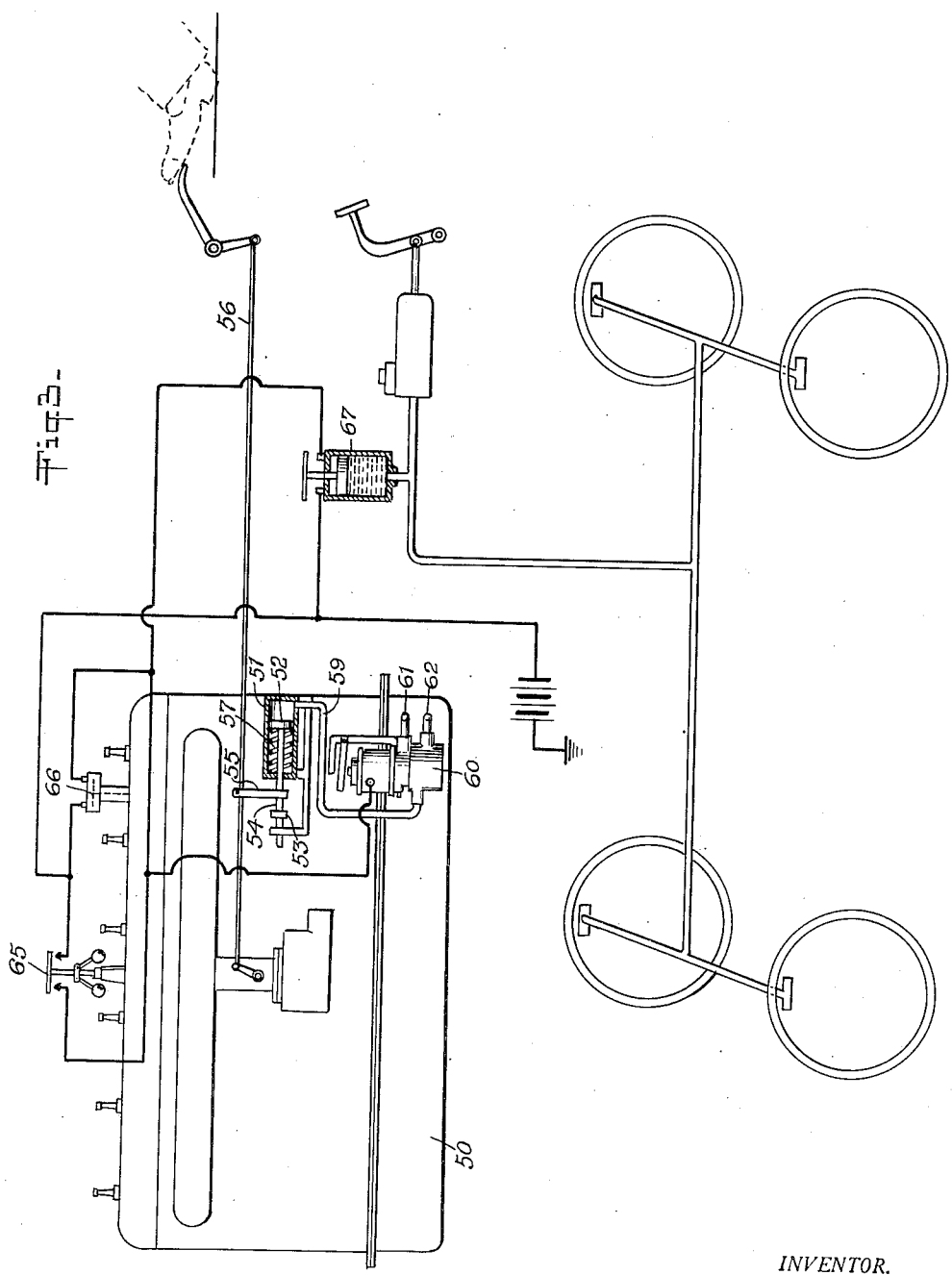

2,527,177

UNITED STATES PATENT OFFICE 2,527,177

SAFETY CONTROL

Max Dach, Flushing, N. Y.

Application January 26, 1945, Serial No. 574,725

2 Claims. (Cl. 123—98)

This invention relates to safety controls, and more particularly to a control system which will warn the operator of a vehicle that the vehicle or some portion thereof needs attention.

An object of the invention is to provide a control mechanism which will prevent or make difficult the operation of a vehicle when the engine is too cold to be operated at high speeds, or where the temperature is above normal, or when a door of the vehicle is open.

Another object of the invention is to provide control means which will signal an operator through the medium of making the operation of the accelerator difficult, but at the same time will not immobilize the vehicle completely, the main purpose being to make improper operation difficult.

Other objects and advantages of my invention will become apparent in the following description and the accompanying drawings, of which Figure 1 is a view of an engine equipped with my system operated by the vacuum of the engine;

Figure 2 is a view in modification thereof, operated by oil pressure;

Figure 3 is a view of a system operated by the oil pressure system of the vehicle.

Referring more particularly to the drawing and to Figure 1, the engine 10, is provided with a thermostatic control valve 11, located in the pipe 12, which leads to the cylinder 14. The cylinder 14 is provided with a spring 15, which tends to move the piston 16 toward one end of the cylinder 14. The piston 16, is connected to the link arms 17 and 18, which contact the bottom of the accelerator 19, when the piston 16, is at one end of the cylinder, thus making the operation of the accelerator difficult since the operator must operate the accelerator against the pressure of the spring 15.

The pipe 12, is also provided with a magnet valve 20, having a valve 21, adapted to interrupt passage through the pipe. The pipe 12, takes vacuum from the engine to the cylinder 14, so that when the valves, 11 and 21 are open, the vacuum from the engine will assert suction on the piston 16, to move it against the spring 15, and to move the lever 18, out of contact with the accelerator 19.

Also mounted in the system is a heat switch 25, adapted to close under abnormal temperatures and an electric governor switch 30, adapted to close when excessive speeds are reached.

A further switch 35, operated by the liquid level in the hydraulic lines 36, is provided so that the switch 35, will close the circuit should the hydraulic fluid fall below a predetermined level.

In operation, when the motor is started and is cold, the thermostatic control valve 11, will remain closed until the temperature of the engine is raised sufficiently for normal operation. This will mean that the lever 18, will be in contact with the accelerator 19, thus making racing the motor or excessive speed difficult. Once the thermostat 11, opens, the vacuum from the motor operating through the pipe 12, will pull the piston 16, against the spring 15, to permit normal operation.

Each of the switches 25, 30 and 35 are linked to a circuit controlling the magnetic valve 20. Should the fluid level fall in the hydraulic system the circuit will close and energize the valve 20, thus cutting off the vacuum and bringing the lever 18, into contact with the bottom of the accelerator. The same thing would happen should speed or temperature become excessive.

In the form shown in Figure 2, I have shown the cylinder 40, carrying the piston 41, connected to the oil pressure line 42, of the engine 10. An arm 43, is attached to the accelerator rod 44, and encircles the shaft 45, of the piston 41. When the piston is forced back the enlargement 46, on the shaft 45, is moved out of the way and does not contact the arm 43, and require the movement of the piston against the spring to permit free operation of the accelerator. With this arrangement it is not possible to race a motor until the oil pressure builds up.

In the form shown in Figure 3, the oil pressure of the engine is used to operate the system. Adjacent the engine 50, is the cylinder 51, carrying the piston 52, with the enlargement 53, on the shaft 54, adapted to engage the arm 55, on the accelerator rod 56, when the piston moves under the pressure of the spring 57. The cylinder 51, has a pipe 59, leading to a magnet valve 60. An oil inlet line 61, and an outlet line 62, connect the valve 60 to the oil pressure line and when the valve is open and there is sufficient pressure the oil will flow through the valve 60, into the cylinder 51, to move the piston 52, against the spring 57. The magnetic valve is connected in a circuit which includes a governor switch 65, an excessive temperature control 66, and a level operated switch 67, controlled by the hydraulic system of the vehicle.

Should the level fluid in the hydraulic system fall so as to make the operation thereof insufficient or ineffective, the switch 67, will close, thus completing the circuit and energizing the magnetic valve 60, which will result in cutting the oil pressure from the cylinder 51, so that the piston will move under pressure of the spring and the arm 55, will be engaged by the enlargement 53, on the shaft 54.

The other switches operate in the same manner as in the other form of my device, the governor switch 65, closing the circuit under excessive speeds and the thermostatic switch 66, closing the circuit under excessive temperatures to energize the magnetic valve 60, and thus to block off the oil from the cylinder 51.

It will be appreciated that a number of other safety controls may be incorporated into the circuit such as a switch to close the circuit when a door is opened, without departing from the spirit of my invention.

I claim:

1. The combination with a motor having a throttle of means for making the operation of said throttle difficult, said means including a cylinder, a piston in said cylinder, a spring tending to push said piston toward one end of said cylinder, means cooperating with said throttle to connect said piston to said throttle when said spring is in extended position, a connection between said cylinder and said motor whereby the vacuum from said motor will cause said piston to compress said spring, and electrically operated valve means controlling said connection.

2. The combination with a motor having an accelerator of a device making operation of said accelerator difficult, said device including a cylinder, a piston in said cylinder, a spring pressing said piston in one direction, means connecting said piston to said accelerator when said spring is extended to require the compression of said spring to operate said accelerator, additional means for compressing said spring to free said accelerator when said motor is in normal operation and an electrically operated valve between said last mentioned means and said cylinder.

MAX DACH.

REFERENCES CITED

The following references are of record in the file of this patent:

UNITED STATES PATENTS

| Number | Name | Date |
|---|---|---|
| 1,833,908 | Malbach | Dec. 1, 1931 |
| 1,968,828 | Hardison | Aug. 7, 1934 |
| 1,980,355 | Prescott et al. | Nov. 13, 1934 |
| 2,010,420 | Simmen | Aug. 6, 1935 |
| 2,077,555 | Frantz | Apr. 20, 1937 |
| 2,111,284 | Girl et al. | Mar. 15, 1938 |
| 2,125,066 | Cox et al. | July 26, 1938 |
| 2,148,816 | Jorgensen | Feb. 28, 1939 |
| 2,157,652 | Merriman | May 9, 1939 |
| 2,225,234 | Schettler | Dec. 17, 1940 |
| 2,260,576 | Maybach | Oct. 28, 1941 |
| 2,293,842 | Mallory | Aug. 25, 1942 |

FOREIGN PATENTS

| Number | Country | Date |
|---|---|---|
| 536,805 | Great Britain | May 28, 1941 |